Oct. 28, 1969

H. BARUCH 3,475,130

SAMPLE TRANSFER APPARATUS

Filed July 3, 1965

INVENTOR.
HANS BARUCH
BY
Schapp & Hatch
ATTORNEYS

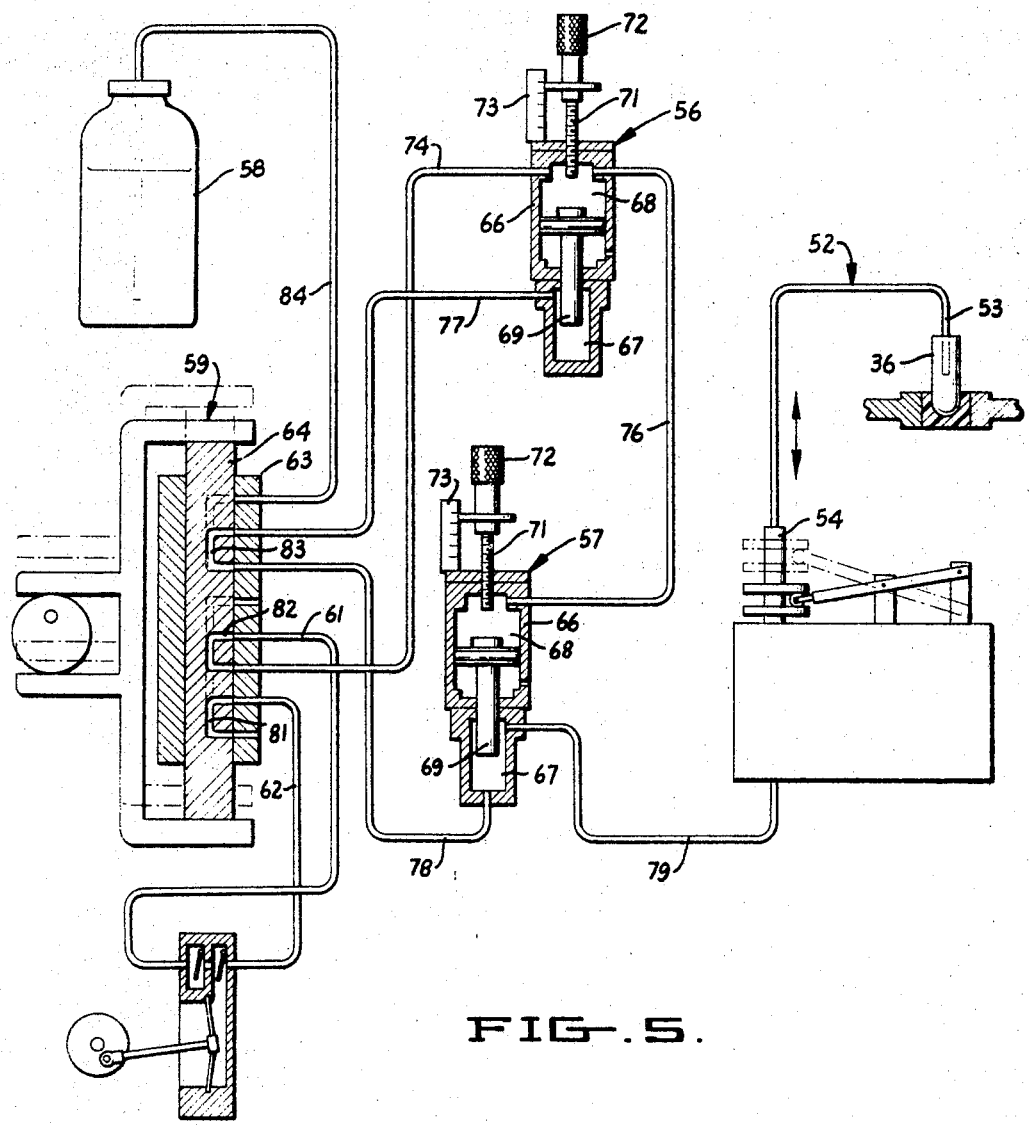

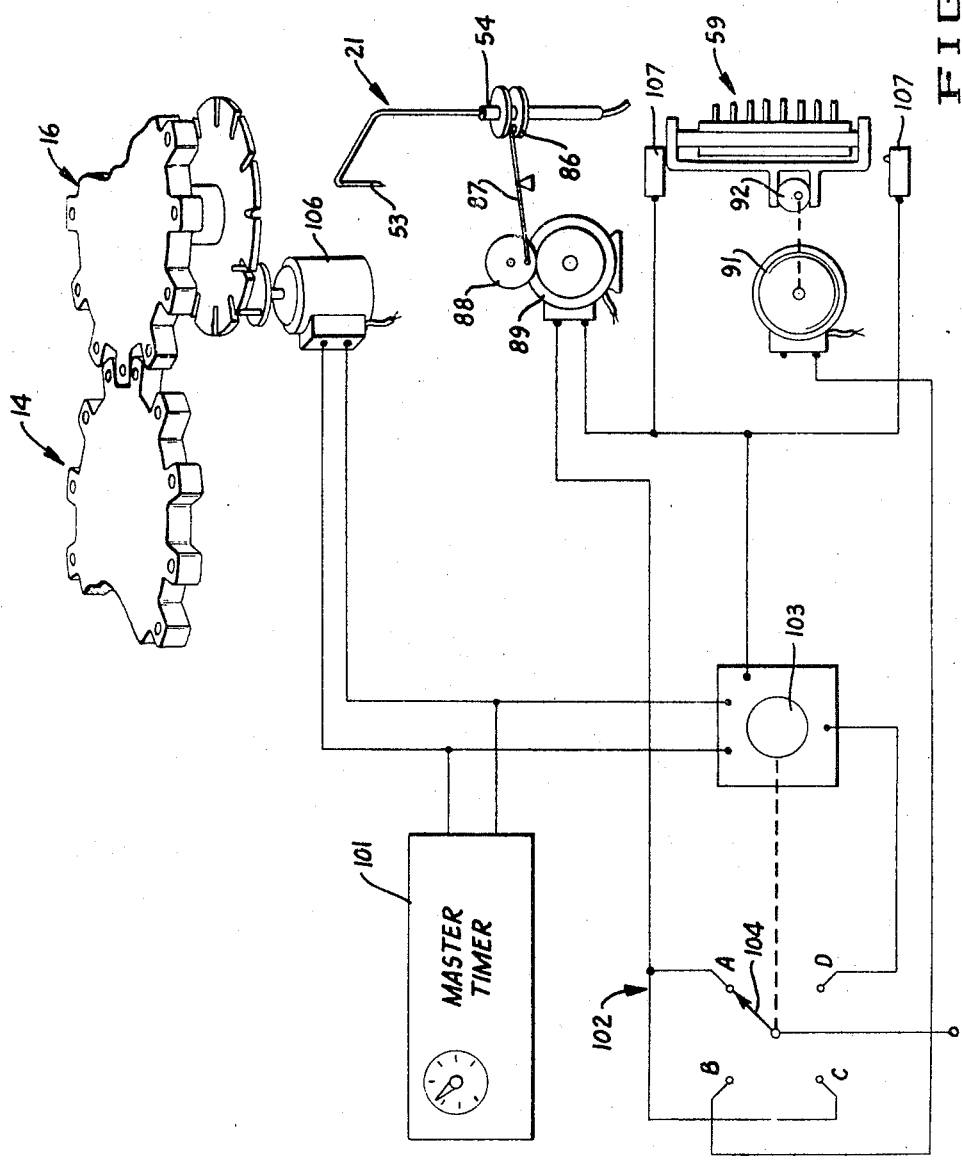

United States Patent Office 3,475,130
Patented Oct. 28, 1969

3,475,130
SAMPLE TRANSFER APPARATUS
Hans Baruch, Berkeley, Calif., assignor to Warner-Lambert Pharmaceutical Company, Morris Plains, N.J., a corporation of Delaware
Filed July 8, 1965, Ser. No. 470,383
Int. Cl. G01n 29/02
U.S. Cl. 23—253                    10 Claims

ABSTRACT OF THE DISCLOSURE

A sample transfer apparatus for automatically moving liquid samples from one movable container to another, comprising a first and second conveyor means constructed for moving a first and second series of sample containers alternately through a single transfer location; transfer means having a probe, means for moving the probe axially in a vertical direction in and out of sample containers at the transfer location, and pump means for drawing sample from a container of the first series and discharging it into a container of the second series; and control means formed to synchronize and to control the movements of the conveyor means, axial movement of the probe, and the pump means, whereby complete automation of the operation is achieved with minimal movement.

Figure 1:
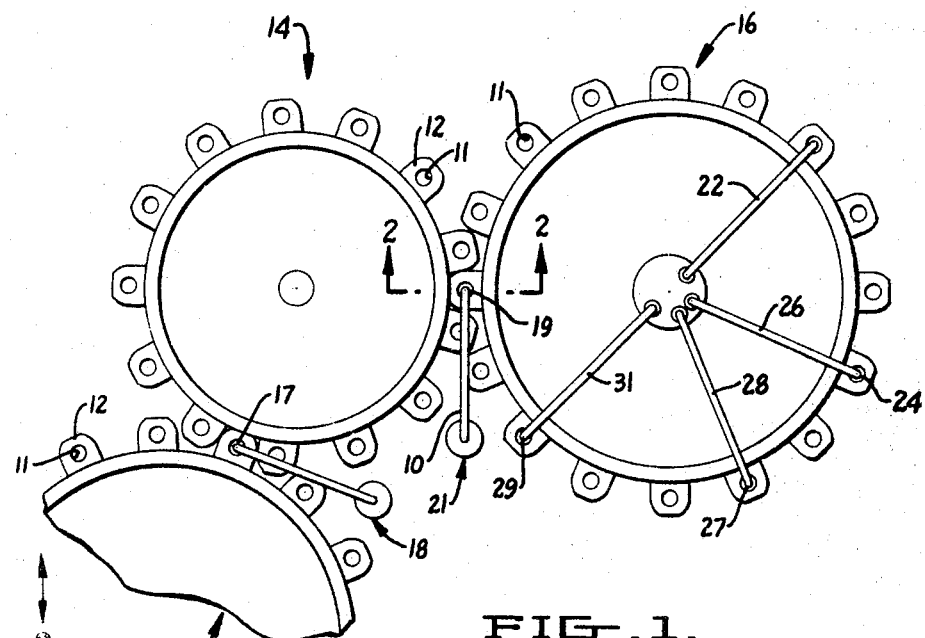

The present invention relates to improvements in a sample transfer apparatus, and more particularly to a sample transfer apparatus for moving sample from one conveyor means to another.

Many types of chemical analyses require the processing of a great number of samples of similar character. The repetitive performance of similar operations lends itself to automation. The use of automatic analyzing equipment can result in material savings in the time of the operator, and has the further advantage of increasing the accuracy of the determinations by reducing the chance of error.

The manipulatory functions to be carried out in performing analyses may be relatively simple or quite complex. It is desirable to carry out the complex operations as well as the comparatively simple operations in an automatic system. Thus, the conditioning of the sample, that is, the preliminary procedures which may be required to effect a desired detectable physical change in the sample, such as accurate measuring of predetermined quantities of sample, addition of precise quantities of diluent or reagents or other materials thereto, performance of manipulatory functions on the sample such as filtering, stirring, etc., and control of the physical environment of the sample, should be carried out precisely and automatically. During these operations, the samples should be maintained in desired sequential relationship in such manner that a particular sample may be identified at any time, and the individual samples should be protected against cross-contamination.

It is also desirable to provide an apparatus which is of modular construction permitting the use of various types of sample conditioning and detecting apparatus whereby the basic apparatus may easily and quickly be converted from one mode of analysis to another. For example, certain automated analytic components have been constructed such as automatic centrifuges, automatic titrators and automated spectrophotometers. Accordingly, such conditioning and detecting steps can be built into an analytic system by combining these apparatus units together.

Such a combination, however, requires the use of means for transferring samples from one unit to another. In prior systems, this transfer was effected by mechanical means which carried samples from a transfer position on one unit to a receiving position on another unit. In a typical case, this required lateral movement of the sample and such lateral movement meant rather complicated mechanical devices were necessary in order to effect the desired transfer.

One of the more satisfactory methods of transferring sample involves the use of a probe which is actuated by a pump so as to operate as a pipette or syringe. Prior to the present invention, the transfer was effected by moving the probe as follows: first the probe is moved into the delivery container and the liquid sample drawn up into the probe; the probe is then lifted vertically out of the container, moved laterally to the receiving container, and the sample discharged into the receiving container either with or without vertical movement of the probe into the receiving container. All of these movements are synchronized with the movement of the sample containers and other operations.

In accordance with the present invention, the transfer is effected simply by moving the probe vertically in and out of the appropriate container at the transfer site without lateral movement of the probe. In other words, the probe is first moved into the delivery container and the liquid sample is drawn up into the probe, the delivery container is then moved by its associated conveyor and the receiving container is moved into place under the probe, and the sample is then discharged into the receiving container. The procedure for taking sample into the probe and removing it therefrom may be effected by any suitable known method as will be explained more fully hereafter. Similarly, the movements will also be synchronized by known methods or by a special gearing action between conveyor means. However, it will be appreciated that with the transfer of sample simplified, the problem of synchronizing the movements is also simplified and a more rapid cycle is obtained. In other words, the transfer may be effected in a shorter period of time and thus provide a more rapid operation of the automated system.

Accordingly, it is a primary object of the present invention to provide a sample transferring apparatus for an automated analytical device which is adapted to provide an improved transfer of sample from one container to another.

Another object of the invention is the provision of a simplified transfer device capable of moving sample from one conveyor to another using a minimum of movement and thereby requiring a simplified construction.

A further object of the invention is to provide a transfer apparatus of the character described in combination with a novel conveyor means whereby the sample transfer mechanism and conveyor means cooperate to provide a simplified transfer system.

A still further object of the invention is to provide a sample transfer apparatus of the character described in which transferring operations are conducted in a rapid and efficient manner so as to provide increased performance of an analytical apparatus embodying the present invention.

Still another object of the invention is to provide a sample transferring apparatus of the character described which is simple in operation and is easily synchronized into the programmed operation of an automated analytical device.

Further objects and advantages of the invention will be apparent as the specification progresses, and the new and useful features of the sample transfer apparatus will be fully defined in the claims attached hereto.

Figure 2:
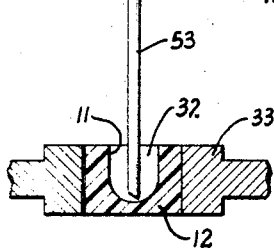
Figure 3:
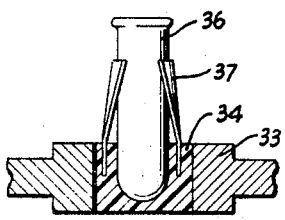
Figure 4:
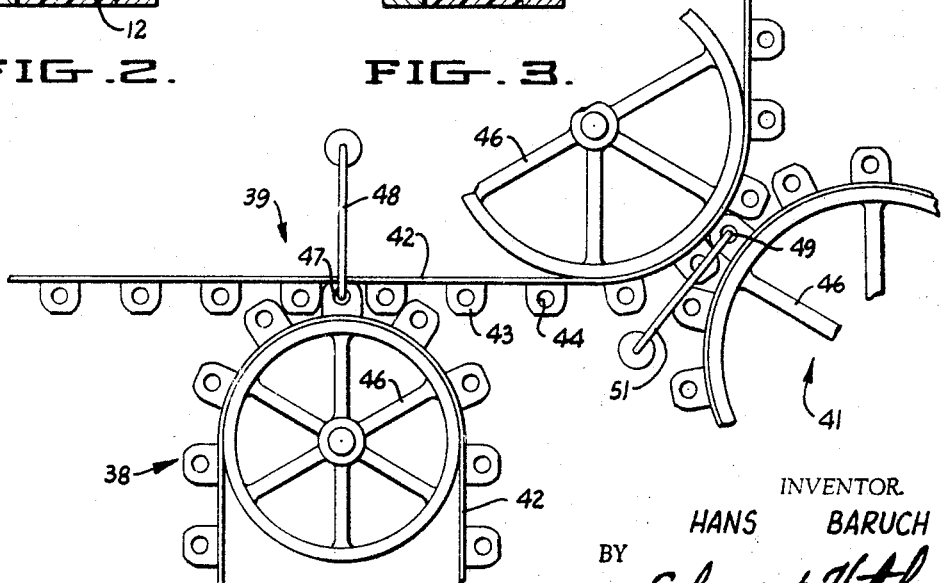

The preferred forms of the invention are illustrated in the accompanying drawings, forming part of this description, in which FIGURE 1 is a schematic plan view illustrating typical conveyors constructed according to the invention and contained in analytical modules and the manner in which they are coordinated together with means for transferring samples between the conveyors in accordance with the present invention;

FIGURE 2, a cross-sectional view taken substantially in the plane of line 2—2 of FIGURE 1 illustrating in better detail a typical probe movement for transferring samples;

FIGURE 3, a view similar to that shown in FIGURE 2 illustrating an alternative method of carrying samples that may be used in accordance with the present invention;

FIGURE 4, a schematic plan view illustrating an alternative form of conveyor means that may be utilized in the practice of the present invention;

FIGURE 5, a schematic elevational view showing certain of the parts in secitons, and illustrating a fluid handling component suitable for use in the present invention; and FIGURE 6, a schematic circuit diagram illustrating a typical means for activating components in accordance with a programmed timed cycle.

While only the preferred form of the invention is shown, it should be understood that various changes or modifications may be made within the scope of the claims attached hereto without departing from the spirit of the invention.

The improved sample transferring apparatus of the present invention, in its broadest aspects, includes a first conveyor means for moving samples sequentially along a first predetermined path, a second conveyor means for moving samples sequentially along a second predetermined path, said first and second predetermined paths passing through a common position, and means for transferring samples from the first conveyor means to the second conveyor means at the common position.

As in FIGURE 1, the samples 11 are held in containers 12 on conveying means 13, 14 and 16 which are formed for transporting evenly spaced discreet samples along a predetermined path of movement. This path of movement may proceed in a straight line or it may describe circles, arcs or other curvilinear configurations. In FIGURE 1, the samples proceed along circular paths in each conveying means and are selectively transferred from one conveyor to another after travelling over a selected fraction of the circle. Each of these conveyors represents distinct modules which are brought together to form an analytic program.

For example, the setup schematically illustrated in FIGURE 1 might illustrate the travel of a sample through an analytical program where a color is developed and the color is checked in an automated spectrophotometer. In such a case, the spectrophotometer would be similar in construction to that shown in the co-pending application Ser. No. 247,622, filed Dec. 27, 1962, entitled Automated Spectrophotometric System, now U.S. Patent No. 3,364,811, and the preliminary handling by an apparatus similar to that shown in the copending application Ser. No. 207,124, filed July 2, 1962, entitled Automated Analytic Apparatus, now U.S. Patent No. 3,193,358, both applications and patents being assigned to the assignee of the present application. However, it will be appreciated that the conveyor systems must be modified as shown schematically in FIGURE 1 to include the improvement of the present invention.

For example, the sample is first placed onto the conveyor means 13 where the samples are carefully carried in indexed fashion in accordance with a number system or other means for retaining identification. The samples then move along on the conveyor means 13 until they reach transfer position 17 where means 18 for transferring samples effects the transfer of samples from conveyor means 13 to conveyor means 14. During this transfer, a suitable diluent may be added to the sample, if desired. The sample then moves on conveyor means 14 until it reaches transfer position 19 where means 21 for transferring samples effects a transfer from conveyor means 14 to conveyor means 16. This means 21 may also dispense a measured quantity of reagent which will develop a characteristic color in the sample indicative of the quantity of a constituent being measured. A sample will then pass around to probe position 22 where the sample is taken up into the spectrophotometer and measured. The sample then continues its movement to probe position 24 where a wash solution is added to probe 26. At 27, the wash solution is removed through probe 28 and at position 29 the sample container is dried by means of air or the like provided through probe 31. The wash liquids and fluids are appropriately pumped according to known procedures. In this way, clean sample containers are presented to transfer position 19 for further operations. Similar means (not shown) may be provided in the various other conveyor units for providing the desired cleaning of sample holders.

The procedural illustration given above is described herein solely for the purpose of illustrating a typical operation which may be carried out according to the invention and it will be appreciated that the operation described is in no way intended to limit the scope of this invention.

An important feature of the invention resides in constructing the conveyors so that the samples are presented at a common position by two different conveyors so that the sample transfer may be effected at this common position with a minimum of equipment as well as providing the other advantages mentioned above. Preferably, the samples are carried in intermeshing relationship and this relationship may be positively assured by driving the two conveyors together. In fact, the intermeshing sample holders can be used to obtain synchronized drive through the common position.

Preferably, the drive system for the conveyor means is constructed to provide an intermittent stop and go movement of the samples so that the samples will be halted at operational positions for a time sufficient to carry out the desired operations as explained in my co-pending application Ser. No. 207,124, now Patent No. 3,193,358, cited above. Thus, it is seen that the samples will be halted at the transfer positions and that by utilizing two different conveyor positions and a simplified transfer operation, the transfer operation is effected without slowing down the analytical operation of the overall apparatus.

The manner in which the sample is carried on the conveyor may vary depending upon such factors as the size of the sample desired to be carried and whether glass sample containers are to be used. For example, FIGURE 2 illustrates how the sample containers 12 may be in the form of a plastic block having a well 32 adapted to receive the probe. These blocks are carried on the periphery 33 of a typical turntable frame serving as the conveyor means.

Alternatively, a tube holder 34 may be provided on the periphery 33 of the turntable so as to carry any suitable tubes such as glass sample tubes 36 as shown in FIGURE 3. As there shown, each tube 36 rests on a tube holder 34 and is held in place by resilient fingers 37 made of spring metal or the like. This embodiment also allows different sized sample tubes to be used with the size of the tubes being limited only by the physical size which can intermesh with a given setup.

Although it is believed to be most practical to utilize turntables for circular movement as illustrated in FIGURE 1 above, it is also contemplated that other types of movements may be used, if desired, and FIGURE 4 illustrates an alternative form of the invention where the samples are moved on belt conveyors instead of turntables. As there shown, conveyor means 38, 39 and 41 each consists essentially of flexible belts 42 having sample holders 43 which contain wells 44 for holding sample material. Alternatively, the sample holders can be constructed to hold sample tubes in accordance with the embodiment of FIGURE 3. The flexible belts are driven by suitable drive means such as pulleys 46 which are preferably located on the side of the belts opposite to the sample holders.

The belts are driven so that their sample holders pass sequentially through a common position to allow transfer to adjacent conveyor means as in the embodiment of FIGURE 1. Thus, the samples may be moved from conveyor means 38 to conveyor means 39 at transfer position 47 by means 48 for transferring sample, and at transfer position 40 by means 51 for transferring sample. Similarly, the samples may be moved between belt conveyors, gear-like turntables or both, in accordance with any desired program.

As explained above, the means 18, 21, 48 and 51 for transferring sample may be any suitable device containing a probe having a syringe action together with synchronized means for effecting axial movement of the probe. A typical transfer device 52 which may be used as any of the means 18, 21, 48 and 51 is illustrated in detail in FIGURE 5.

As there shown, the device comprises a probe or pipette 53 which is mounted for movement on a movable mount 54, pumps 56 and 57, reagent or diluent reservoir 58, and valves 59 which provide communication of the pumps with either a pressure line 61 or a vacuum line 62. The valve 59 may be any valve capable of providing the position shown with valve blocks 63 and 64 aligned as shown in FIGURE 5 and movable so as to be aligned as shown in phantom in FIGURE 5. A typical valve and mechanism suitable for operating the same is described and claimed in the co-pending application Ser. No. 183,506 of Erik W. Anthon, entitled "Valve," and filed Mar. 29, 1962, now U.S. Patent No. 3,199,538, assigned to the assignee of the present invention.

Both pumps 56 and 57 are similarly constructed and adapted to operate by means of air pressure or vacuum with the air pressure causing each of the pumps to move a piston or plunger in one direction and the vacuum causing each of them to move the piston in reverse direction. Thus, each pump comprises a housing 66 enclosing chambers 67 and 68 with chamber 68 adapted to activate a piston 69 which communicates down into chamber 67 and effects movement of liquid into and out of the chamber, depending upon the valve positions in the associated lines.

In order to accurately adjust the volume of liquid taken into the chambers 67, stop means 71 are provided to limit the movement of the piston 69. In order to adjust the stop means 71, knurled handle 72 is rotated which moves stop means 71 through a sealed threaded engagement with the housing 66, as shown in FIGURE 5. The setting may be accurately adjusted on a suitable gauge 73 which may include a vernier device (not shown) or any other conventional measuring scale for providing accurate measurements.

In the operation of the transfer device, the probe 53 is moved to the position shown in FIGURE 5 when liquid is being discharged from the probe into a receiving container 36 or alternatively to a sample well 32. This discharge is effected because pressurized air enters through line 61 and communicates through lines 74 and 76 to the chambers 68 and forces the pistons 69 downwardly. This causes chambers 67 to be decreased in volume so that liquid from the upper chamber 67 goes through lines 77 and 78 through lower chamber 67, and the material in both upper and lower chambers 67 then passes through line 79 and out through the probe as indicated above. Moveable mount 54 then lifts the probe and the conveyor means moves the sample delivered as explained above out of the transfer position while the conveyor means which supplies sample is moved into the transfer position. The mount 54 then lowers the probe into the sample.

When the sample is taken in through the probe, reagent or diluent is also taken into upper chamber 67 of the pump 56 provided for this purpose. This is affected by moving valve 59 so that the block 64 and its passages are in the position as shown in phantom in FIGURE 5. Line 74 is then in communication with suction line 62 through passage 81, while the pressure line 61 is in communication with the atmosphere through passage 82. Similarly, passage 83 connects line 77 with line 84 leading to the reservoir or container 58. With line 74 connected to vacuum, pistons 69 are urged upwardly. This causes the upper chamber 67 to draw reagent or diluent from the reservoir through line 77 and line 84 communicating therewith, while the lower chamber 67 draws sample up into the probe as liquid is drawn back in line 79. It should be noted that line 78 is closed during this operation so that no diluent or reagent is in communication with the lower chamber.

This system is capable of taking in accurately measured quantities of sample and diluent or reagent and dispensing them, with the reagent or diluent following the sample so as to flush the probe clean for the next cycle of operation. Alternatively, a system may be employed which is capable of taking in an excess quantity of sample and dispensing a precisely measured aliquot thereof, the excess sample serving to wash out the probe before the dispensed portion of the sample is taken in. The latter system is particularly suitable where it is not desired to add diluent or reagent. A suitable system for washing out with a measured quantity of reagent or diluent is more fully described and claimed in the copending application of Hans Baruch, the inventor of the present invention, and Erik W. Anthon, Ser. No. 207,111, filed July 2, 1962, now reissue Patent No. 26,055, and assigned to the same assignee as the present invention. A typical apparatus for washing out with additional sample is more fully described and claimed in the co-pending application of Erik W. Anton, Ser. No. 207,119, filed July 2, 1962, now Patent No. 3,193,148, and assigned to the same assignee as the present application. The exterior of the probe should be made hydrophobic and in such case it often will not be necessary to clean the exterior of the probe. However, it should be apparent that rinsing of the probe between samples could also be provided, if required, by any suitable means. In general, the means 21 for transferring sample may include any suitable movable mount 54 capable of moving the probe end into and out of position in the sample containers. As shown diagrammatically in FIGURE 6, the tube holder 54 may include a collar 86 which is moved up and down by a lever 87 which is pivoted by movement of eccentric 88 as it is driven through half revolutions by motor 89. Similarly, valve 59 is driven between its two positions by motor 91 acting through eccentric 92.

In order to achieve the desired results, it is important that precise control over the chemical reaction times and other conditioning factors is accomplished. In order to attain this in a flexible system, the length of time each sample is subjected to conditioning is determined by positioning the various probes so that the addition of reagent, extraction of sample and other treatments are influenced by the time it takes the sample to travel from one given position to another. This may be accurately timed by moving the samples from one station to the next in exact or equal increments of time, that is, the time period from the moment the sample is moved into a new station to the moment it is moved into the next station, must have precisely the same duration as any corresponding time.

Suitable control over the described time increments may be provided by a master timer 101 and an actuating means 102 for activating the drive to the conveying means 13, 14 and 16 and various conditioning and detecting components so as to effect operation thereof in the the desired sequence. Master timer 101 provides precisely timed signals for starting each cycle or sequence of operation and the means 102 insures that the various devices complete their operations at the proper times during the cycles. The master timer 101 may be any suitable type which is capable of producing a mechanical or electrical signal at intervals of precisely the same duration. In the schematic circuit illustrated in FIGURE 6, a timer producing equally spaced electrical impulses is employed.

The activating means 102 may comprise limit switches, auxiliary timers or other devices for activating the components in desired sequence. As here shown, the means 102 includes a rotary stepping switch having a synchronous drive motor 103 for rotating a switch arm 104 along a desired number of contacts A through D, these contacts being adapted for providing starting signals to the drive means for the various components. In addition, the contact D operates to alternately repeat the cycle and stop and reset the motor. The double cycling operation is required because the conveyors have to be advanced twice and the sample transfer mechanism operates with a container of each conveying means before the complete cycle is accomplished. In other words, a complete cycle consists of two similar half cycles.

In operation, the impulse from master timer 101 starts the stepping switch motor 103 as well as the conveyor drive motor 106. The latter moves the turntable one-half station ahead and then halts the conveyor until the activating means 102 gives it the repeat signal so as to continue driving the other half increment and present the next sample container from conveying means 16 at the sample site. In the embodiment shown in FIGURE 6, the conveyor 14 is driven by conveyor 16 with the sample holders serving the functions of gear teeth. Thus, synchronous drive from the two conveyors is positively assured. The movement of the samples takes place while the stepping switch arm 104 is moving from contact D to contact A and the activation of the various transferring devices normally occurs while the conveyors are halted.

When switch arm 104 reaches contact A, a starting signal is transmitted to the control means for motor 89 which acts through eccentric 88 and lever 87 to lower the probe into the sample. As soon as this is accomplished, a return signal from means such as a limit switch or auxiliary timer causes switch motor 103 to move arm 104 to contact B. This contact signals the control means for the drive motor 91 which changes valve 59, causing liquid sample to be drawn into the illustrated probe. Limit switch 107 halts motor 91 and starts switch motor 103. The switch arm then continues to contact C where motor 89 is activated to raise the probe containing sample. Switch arm 104 then reaches contact D where a repeat cycle is started.

In the repeat cycle, motor 106 first drives the conveyor means 14 and 16, and the probe is lowered when switch arm 104 reaches contact A as in the first cycle. However, when switch arm 104 reaches contact B, the valve 59 is moved to reverse position so as to cause delivery of sample and reagent or diluent depending upon the particular system used. Then when the switch arm reaches contact C, the probe is raised again as before. Finally, when switch arm 104 reaches contact D in the second cycle, the activating means 102 is shut off and reset for the next cycle from master timer 101. With this reset mechanism, completion of cycles is positively assured so as to provide a fail safe system and assure that all operations have taken place. This fail safe system also allows the most efficient use of the apparatus by setting the master timer to as short a duration as possible and yet be sure that the duration is not made too short. Of course, the particular cycle illustrated in FIGURE 6 is merely typical of one of the types of programming arrangements, and other cycles may be used as required.

From the foregoing description, it is seen that I have provided an improved sample transfer apparatus capable of use in fully automated analytic equipment which reduces the number of mechanical parts and facilitates rapid and accurate operation.

I claim:

1. A sample transferring apparatus comprising a first conveyor means, a plurality of sample holders carried on said first conveyor means for movement sequentially along a first predetermined path, a second conveyor means, a plurality of sample holders on said second conveyor means for moving samples sequentially along a second predetermined path, said first and second conveyor means disposed in juxtaposed position and constructed to provide movement of the sample holders on both conveyor means through a common position, and sample transfer means located at said common position for movement of sample from the sample containers on the first conveyor to the sample containers on the second conveyor, said sample transfer means having means for removing liquid sample from the first sample conveyor means at said common position and for delivering said liquid sample to the second sample conveyor means at said common position.

2. A sample transferring apparatus comprising a first conveyor means, a plurality of sample holders carried on said first conveyor means for movement sequentially along a first predetermined path, a second conveyor means, a plurality of sample holders on said second conveyor means for moving samples sequentially along a second predetermined path, said first and second conveyor means disposed in juxtaposed position and constructed to provide movement of the sample holders on both conveyor means through a common position, means for synchronizing the movement of the first and second conveyor means in such a way that only one sample container is presented to the common position at a time, and sample transfer means located at said common position for movement of sample from the sample containers on the first conveyor to the sample containers on the second conveyor, said sample transfer means having means for removing liquid sample from the first sample conveyor means at said common position and for delivering said liquid sample to the second sample conveyor means at said common position, and means for synchronizing the operation of the sample transfer means with the movement of the first and second conveyor means.

3. The sample transfer apparatus defined in claim 2 in which the sample holders are constructed similar to gear teeth and intermesh at the common position.

4. A sample transferring apparatus comprising a first conveyor means for moving samples sequentially along a first predetermined path, a second conveyor means for moving samples sequentially along a second predetermined path, said first and second predetermined paths passing through a common position, a probe mounted for axial movement in a vertical direction at said common position, means for drawing sample into said probe and expelling sample from the probe, and means for moving the probe axially and vertically into sample containers at said common position and out of said sample container.

5. A sample transferring apparatus comprising a first conveyor means, a plurality of sample holders carried on said first conveyor means for movement sequentially along a first predetermined path, a second conveyor means, a plurality of sample holders on said second conveyor means for moving samples sequentially along a second predetermined path, said first and second conveyor means disposed in juxtaposed position and constructed to provide movement of the sample holders on both conveyor means through a common position, a probe mounted for axial movement in a vertical direction at said common position, means for drawing liquid sample into said probe and expelling said sample from the probe, and means for moving the probe axially and vertically into sample containers at said common position and out of said sample container.

6. A sample transferring apparatus comprising a first conveyor means, a plurality of sample holders carried on said first conveyor means for movement sequentially along a first predetermined path, a second conveyor means, a plurality of sample holders on said second conveyor means for moving samples sequentially along a second predetermined path, said first and second conveyor means disposed in juxtaposed position and constructed to provide movement of the sample holders on both conveyor means through a common position, means for synchronizing the movement of the first and second conveyor means in such a way that only one sample contanier is presented to the common position at a time, a probe mounted for axial movement in a vertical direction at said common position, means for moving the probe axially and vertically into sample containers at said common position, means for drawing sample into said probe from a sample container on said first conveyor means at said common position, means for moving the sample container on the first conveyor means from the common position and moving a sample container on the second conveyor means into said common position, and means for expelling sample from the probe at said common position.

7. A sample transferring apparatus comprising a first conveyor means, a plurality of sample holders carried on said first conveyor means for movement sequentially along a first predetermined path, a second conveyor means, a plurality of sample holders on said second conveyor means for moving samples sequentially along a second predetermined path, said first and second conveyor means disposed in juxtaposed position and constructed to provide movement of the sample holders on both conveyor means through a common position, means for advancing samples on said first and second conveyor means in an intermittent stop and go motion with the samples on both conveyor means being alternately stopped at said common position, and sample transfer means located at said common position for movement of sample from the sample containers on the first conveyor to the sample containers on the second conveyor, said sample transfer means having means for removing liquid sample from the first sample conveyor means at said common position and for delivering said liquid sample to the second sample conveyor means at said common position.

8. A sample transferring apparatus comprising a first conveyor means, a plurality of sample holders carried on said first conveyor means for movement sequentially along a first predetermined path, a second conveyor means, a plurality of sample holders on said second conveyor means for moving samples sequentially along a second predetermined path, said first and second conveyor means disposed in juxtaposed postion and constructed to provide movement of the sample holders on both conveyor means through a common position, means for advancing samples on said first and second conveyor means in an intermittent stop and go motion with the samples on both conveyor means being alternately stopped at said common position, a probe mounted for axial movement in a vertical direction at said common position means for drawing sample into said probe and expelling sample from the probe, and means for moving the probe axially and vertically into sample containers at said common position and out of said sample container.

9. A sample transferring apparatus comprising a first conveyor means, a plurality of sample holders carried on said first conveyor means for movement sequentially along a first predetermined path, a second conveyor means, a plurality of sample holders on said second conveyor means for moving samples sequentially along a second predetermined path, said first and second conveyor means disposed in juxtaposed position and constructed to provide movement of the sample holders on both conveyor means through a common position, means for advancing samples on said first and second conveyor means in an intermittent stop and go motion with the samples on both conveyor means being alternately stopped at said common position, a probe mounted for axial movement in a vertical direction at said common position, means for moving the probe axially and vertically into sample containers at said common position and out of said sample container, means for drawing sample into said probe from a sample container on said first conveyor means at said common position, means for moving the sample container on the first conveyor means from the common position and moving a sample container on the second conveyor means into said common position, and means for expelling sample from the probe at said common position.

10. The sample transferring apparatus defined in claim 9, in which control means are provided to synchronize the movements of the conveyors, axial movement of the probe, and the means for drawing sample into and discharging sample from the probe.

References Cited

UNITED STATES PATENTS

| | | | |
|---|---|---|---|
| 2,624,456 | 1/1953 | Andrews et al. | 23—259 |
| 2,858,862 | 11/1958 | Francisco | 198—25 XR |
| 3,039,587 | 6/1962 | Pollmann | 198—25 XR |
| 3,044,599 | 7/1962 | Gajda et al. | 198—25 |
| 3,151,073 | 9/1964 | Anthon | 23—259 XR |
| 3,178,266 | 4/1965 | Anthon | 23—253 |

MORRIS O. WOLK, Primary Examiner

R. E. SERWIN, Assistant Examiner

U.S. Cl. X.R.

23—259; 141—130, 270; 198—25